United States Patent
Midya et al.

(10) Patent No.: US 9,806,919 B2
(45) Date of Patent: Oct. 31, 2017

(54) SYSTEM AND METHOD FOR CLOCK SPUR ARTIFACT CORRECTION

(71) Applicant: Futurewei Technologies, Inc., Plano, TX (US)

(72) Inventors: Pallab Midya, Palatine, IL (US); Hong Jiang, Kernersville, NC (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/884,578

(22) Filed: Oct. 15, 2015

(65) Prior Publication Data

US 2017/0111191 A1  Apr. 20, 2017

(51) Int. Cl.
| | | |
|---|---|---|
| H04K 1/02 | (2006.01) | |
| H04L 25/03 | (2006.01) | |
| H04L 25/49 | (2006.01) | |
| H04L 25/06 | (2006.01) | |

(52) U.S. Cl.
CPC .................................. *H04L 25/061* (2013.01)

(58) Field of Classification Search
CPC combination set(s) only.
See application file for complete search history.

(56) References Cited

U.S. PATENT DOCUMENTS

| | | | |
|---|---|---|---|
| 8,461,901 B1 * | 6/2013 | Morton | ................ H03D 7/1441 327/355 |
| 8,988,049 B2 | 3/2015 | Midya | |
| 2012/0322398 A1 * | 12/2012 | Pullela | ................ H03D 7/1466 455/302 |
| 2013/0157604 A1 * | 6/2013 | Jantzi | ..................... H04B 1/525 455/296 |
| 2015/0155836 A1 | 6/2015 | Midya et al. | |

OTHER PUBLICATIONS

Hassan, et al., "High Efficiency Envelope Tracking Power Amplifier with Very Low Quiescent Power for 20 MHz LTE," Radio Frequency Integrated Circuits Symposium (RFIC), IEEE, Jun. 5-7, 2011, pp. 1-4.

* cited by examiner

*Primary Examiner* — Wednel Cadeau
(74) *Attorney, Agent, or Firm* — Slater Matsil, LLP

(57) ABSTRACT

A method for clock spur artifact correction includes obtaining a plurality of switching stage input signals generated in accordance with an input signal level of an external amplifier, and adjusting the plurality of switching stage input signals such that a clock spur harmonic artifact is reduced. The clock spur harmonic artifact includes a first clock spur harmonic artifact generated in a plurality of external signal paths including external switching stages, and the adjusting the plurality of switching stage input signals includes one of: adjusting a duty ratio of one of the plurality of switching stage input signals in accordance with a gain mismatch between two of the external signal paths; and injecting a first Continuous Wave (CW) signal into the plurality of switching stage input signals in accordance with a previous amplitude of the first clock spur harmonic artifact.

22 Claims, 13 Drawing Sheets

SYSTEM AND METHOD FOR CLOCK SPUR ARTIFACT CORRECTION

TECHNICAL FIELD

The present invention relates generally to a system and method for correcting switching artifacts, and, in particular embodiments, to a system and method for correcting switching artifacts of multi-phase open loop envelope tracking signals.

BACKGROUND

Techniques for modulating a supply voltage using Envelope Tracking (ET) are desired for a number of applications, including wireless transmission from cell phones. One challenge in designing such systems is reducing the amount of artifacts introduced into the supply voltage by the modulation process.

SUMMARY

In accordance with a first example embodiment of the present invention, a method for clock spur artifact correction is provided. The method includes obtaining a plurality of switching stage input signals generated in accordance with an input signal level of an external amplifier, and adjusting the plurality of switching stage input signals such that a clock spur harmonic artifact is reduced. The clock spur harmonic artifact includes a first clock spur harmonic artifact generated in a plurality of external signal paths including external switching stages, and the adjusting the plurality of switching stage input signals includes one of: adjusting a duty ratio of one of the plurality of switching stage input signals in accordance with a gain mismatch between two of the external signal paths; and injecting a first Continuous Wave (CW) signal into the plurality of switching stage input signals in accordance with a previous amplitude of the first clock spur harmonic artifact.

In accordance with a second example embodiment of the present invention, an integrated circuit is provided. The integrated circuit includes: a Digital-to-Analog Converter (DAC) including outputs coupled to a plurality of external signal paths, such that the external signal paths include external switching power supplies coupled to a supply voltage input of an external amplifier; and a spur correction circuit coupled between a data input of the external amplifier and an input of the DAC. The spur correction circuit includes: a digital Continuous Wave (CW) injection circuit including a digital adder circuit coupled between a memory circuit and the DAC, such that the memory circuit includes a first memory location storing a first correction coefficient that is proportional to a previous amplitude of a first clock spur harmonic component of an output signal of the plurality of external signal paths.

In accordance with a third example embodiment of the present invention, there is provided a calibration method including obtaining an amplifier supply voltage signal generated by a plurality of external switching stages. The calibration method also includes: detecting an amplitude of a first clock spur harmonic artifact of the amplifier supply voltage signal; obtaining a plurality of switching stage input signals generated in accordance with an input signal level of an external amplifier; adding a first Continuous Wave (CW) signal to the plurality of switching stage input signals, the first CW signal including a first signal level such that the amplitude of the first clock spur harmonic artifact is reduced; and determining a first correction coefficient in accordance with the first signal level.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various embodiments, instead of using battery voltage directly on a Power Amplifier (PA) supply, the supply is modulated based on the PA input signal level. When the PA input signal level is low, the supply voltage is reduced and when the PA input signal level is high, the supply voltage is increased. This method is referred to in this disclosure as Envelope Tracking (ET). An ET modulator is used to modulate the PA supply voltage. This ET modulator includes a number N of parallel switching power supplies that introduce into the modulator switching artifacts including clock spur harmonic artifacts. The ET modulator receives an N-phase PWM signal as its input.

The N parallel signal paths that include the N switching power supplies are not built from ideal identical components but instead may have differing gain and delay. As a result, the set of mth-order clock spur harmonics at frequencies of $m \cdot f_{sw}$ that are generated for a switcher core running at a clock rate of $f_{sw}$ may not be completely cancelled unless further techniques are applied. To prevent problems that may be introduced by residual clock spurs, CW tones are directly injected into the PWM signal at clock spur harmonic frequencies to correct artifacts introduced by both gain and delay mismatch. The CW spur correction signals are generated within a digital circuit that is adaptive to the PWM duty cycle such that a wide variety of signal types may be accommodated, including, for example, Long-Term Evolution (LTE), Code Division Multiple Access (CDMA), Wideband CDMA, Time Division Synchronous CDMA, etc.

Figure 1:
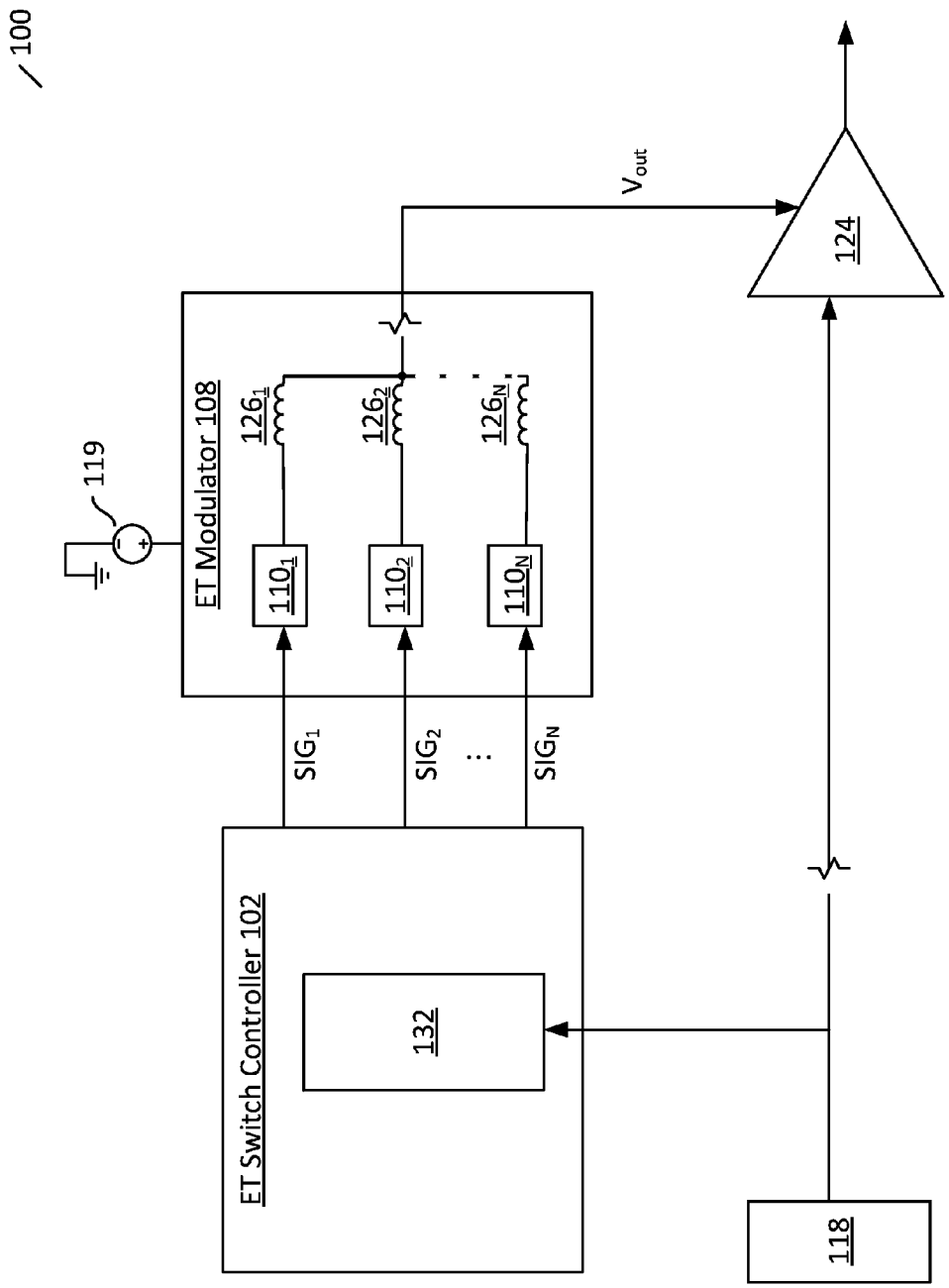
FIG. 1 is a block diagram illustrating a multi-phase ET system that provides clock spur correction in accordance with embodiments of the present invention.

FIG. 1 shows an embodiment multi-phase ET system 100 that provides clock spur correction. The system 100 includes a data source 118, an ET switch controller 102, an N-phase ET modulator 108, and an amplifier 124. The data source 118 may be any source generating a data signal to be amplified, including, for example, a microphone transducing a voice signal in a mobile phone, a mainframe, a microprocessor Integrated Circuit (IC), etc. The amplifier 124 receives this data signal from the data source 118 and amplifies it. The amplifier 124 also receives a supply voltage $V_{out}$ from the ET modulator 108, which is connected to a DC voltage source 119.

The ET modulator 108 includes N multiple signal paths that each include one of switching stages $110_1$-$110_N$ and one of output inductors $126_1$-$126_N$, respectively. The switching stages $110_1$-$110_N$ each respectively provide an output to one of the output inductors $126_1$-$126_N$, which in turn provide parallel output voltages that are added together to form the single output voltage $V_{out}$ of the ET modulator 108.

The output voltages of switching stages $110_1$-$110_N$ are generated based on switching stage input signals $SIG_1$-$SIG_N$, which are staggered in phase by increments of $2\pi/N$ and control the switching of the switching stages $110_1$-$110_N$ at a switching frequency of $f_{sw}$. In some embodiments, the switching stages $110_1$ to $110_N$ are switched mode power supplies. Each of the parallel output voltages from the output inductors $126_1$-$126_N$ include mth-order clock spur harmonics that are each at a frequency of $m \cdot f_{sw}$, where m may be any positive integer.

The switching stage input signals $SIG_1$-$SIG_N$ are generated by the ET switch controller 102. The ET switch controller 102 receives a replica copy of the data signal from data source 118 and generates the switching stage input signals $SIG_1$-$SIG_N$ such that the signal level of the $V_{out}$ signal generated by ET modulator 108 tracks the signal level of the data signal that is provided as an input signal to amplifier 124.

The N parallel signal paths that include the switching stages $110_1$-$110_N$ are not built from ideal identical components but instead have differing gain and delay. The clock spur harmonics of the parallel output voltages would thus result in artifacts in $V_{out}$ if such clock spur artifacts were not reduced by the operation of a spur correction circuit 132 that is included in the ET switch controller 102. Operation of certain embodiments of the spur correction circuit 132 will be described in reference to FIGS. 2A-2B.

Figure 2A:
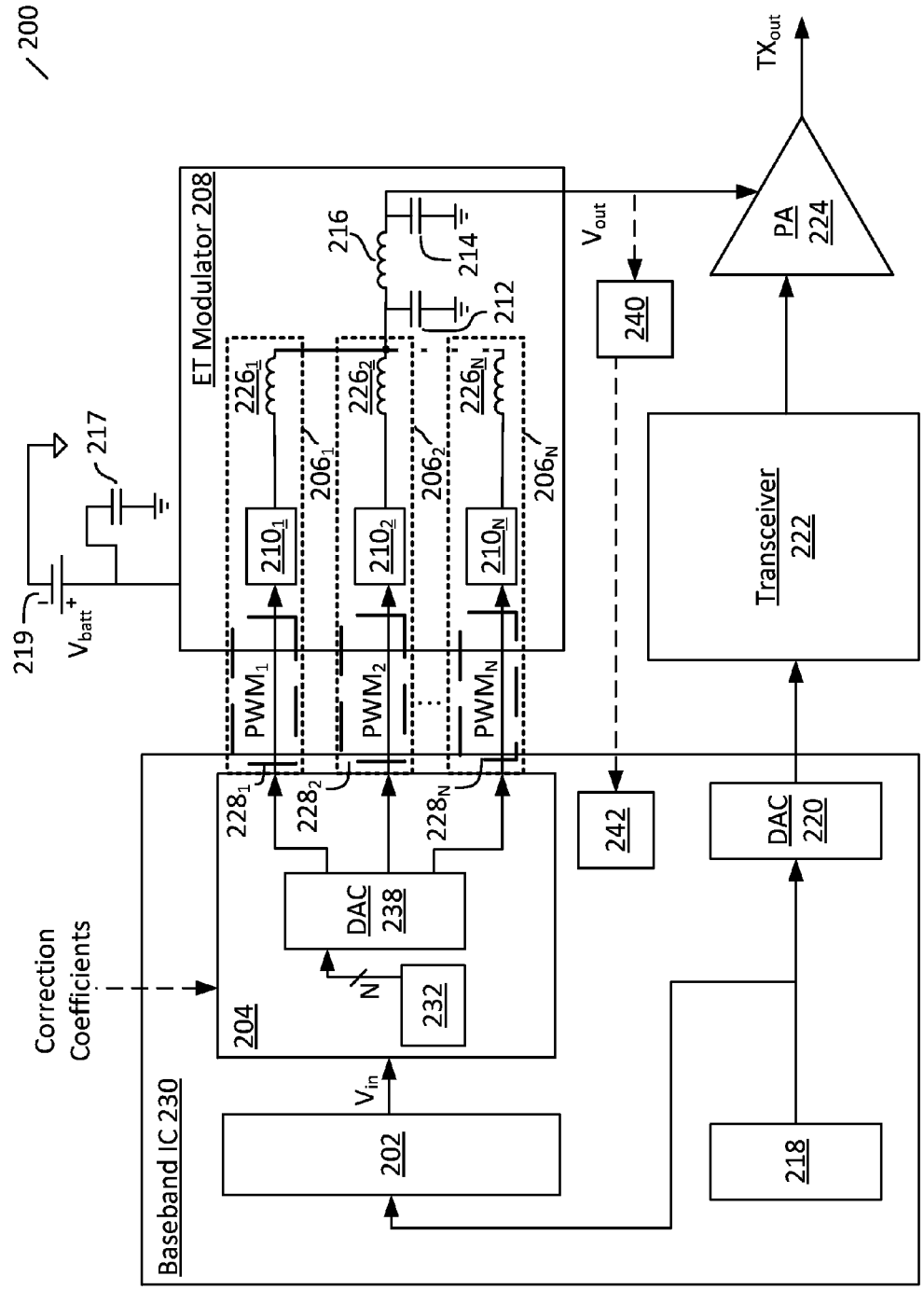
FIG. 2A is a block diagram illustrating a Pulse Width Modulation (PWM) ET system that may be used in the multi-phase ET system of FIG. 1, in accordance with embodiments of the present invention.

FIG. 2A shows an embodiment system 200 that may be used in the multi-phase system 100 of FIG. 1. The system 200 includes a baseband IC 230, an N-phase ET modulator 208, a transceiver 222, and a PA 224. The baseband IC 230 includes an I/Q source 218 that generates digital I and Q data components and provides them to a Digital-to-Analog Converter (DAC) 220, which converts this digital I/Q data to analog form and provides it as analog I/Q data to transceiver 222. Transceiver 222 converts the analog I/Q data to an analog pre-amplifier signal that is then amplified by PA 224 to obtain an output transmission signal $TX_{out}$.

The I/Q source 218 also provides the digital I/Q data to envelope generation/pre-distortion stage 202, which generates an ET signal $V_{in}$ in response to the I/Q data. In other words, the voltage levels for the ET signal $V_{in}$ may be determined from the voltage range of the I/Q data. Persons of ordinary skill in the art are aware that a variety of methods may be used to process I/Q data to generate an ET signal. In some embodiments, the ET signal $V_{in}$ generated by the envelope generation/pre-distortion stage 202 includes a pre-distortion compensation signal based on a load variation at a PA supply voltage path. U.S. patent application Ser. No. 14/094,398, entitled "Nonlinear Load Pre-Distortion for Open Loop Envelope Tracking," filed on Dec. 2, 2013, which is hereby incorporated herein by reference, provides further detailed description of envelope generation and pre-distortion that may be utilized by embodiments disclosed herein.

Referring again to FIG. 2A, envelope generation/pre-distortion stage 202 provides the ET signal $V_{in}$ to N-phase PWM generation stage 204 that includes a clock spur correction circuit 232. The PWM generation stage 204 is configured to perform a PWM on the ET signal $V_{in}$ to create pulse waves that conform to this compensated envelope signal. In some embodiments, the PWM generation stage 204 may improve signal linearity by performing signal modulation in the digital domain where the widths (and therefore duty ratios) of the pulses correspond to specific data values of the ET signal $V_{in}$.

Referring again to FIG. 2A, these pulse waves generated by PWM generation stage 204 include a basis PWM signal $PWM_1$ and a set of (N-1) signals $PWM_2$ to $PWM_N$ that are phase-shifted replicas of basis signal $PWM_1$. The PWM generation stage 204 provides these signals $PWM_1$ to $PWM_N$ to parallel signal paths $206_1$ to $206_N$ via PWM interfaces $228_1$-$228_N$ included in these signal paths, respectively. Each of these parallel signal paths $206_1$ to $206_N$ also respectively includes one of switching stages $210_1$ to $210_N$ (of ET modulator 208) and one of output inductors $226_1$ to $226_N$ (of ET modulator 208) that receives the output signal of the switching stage. The switching frequency $f_{sw}$ of the switching stages $210_1$ to $210_N$ is the reciprocal of a period of the signals $PWM_1$ to $PWM_N$. The ET modulator 208 is connected to a battery 219, which is in parallel with a low-pass filtering capacitor 217 and which provides a voltage $V_{batt}$ to the ET modulator 208. The parallel signal paths 206$_1$ to 206$_N$ also include interfaces 228$_1$ to 228$_N$, which are the portions of the signal paths located between the PWM generation stage 204 and the switching stages 210$_1$ to 210$_N$.

The parallel signal paths 206$_1$ to 206$_N$ respectively generate parallel output voltages at the outputs of output inductors 226$_1$ to 226$_N$. These parallel output voltages are combined to form a single voltage that is then filtered by output filter 216 to provide the voltage $V_{out}$ that is used as a voltage supply of PA 224. A path mismatch, such as a gain or delay mismatch, may exist in the N parallel signal paths 206$_1$ to 206$_N$. The path mismatch may come from any of the output inductors 226$_1$ to 226$_N$, switching stages 210$_1$ to 210$_N$, and/or PWM interfaces 228$_1$-228$_N$.

During a calibration mode such as, for example, a mode used during an initial factory calibration sequence, the spur correction circuit 232 is initially disabled, which allows the path mismatch of signal paths 206$_1$ to 206$_N$ to generate clock spur artifacts in $V_{out}$. In some embodiments, a spectrum analyzer is connected to the PA voltage supply during the calibration sequence to detect these amplitudes of clock spur harmonics in $V_{out}$. In the embodiment of FIG. 2A, however, a spur level estimation stage 242 is included in the baseband IC 230 and a dedicated spur monitoring circuit 240 is connected to the PA voltage supply during the calibration sequence to detect the amplitudes of clock spur harmonics in $V_{out}$. The spur correction circuit 232 may be adjusted while monitoring one or more of these spur levels in $V_{out}$. Spur level estimation stage 242 estimates correction coefficients that reduce these spur levels so that these coefficients may be stored for later operational use. The spur level estimation stage 242 may do so using an estimation method such as those embodiment methods to be described in reference to FIG. 5A and FIG. 5B.

Figure 2B:
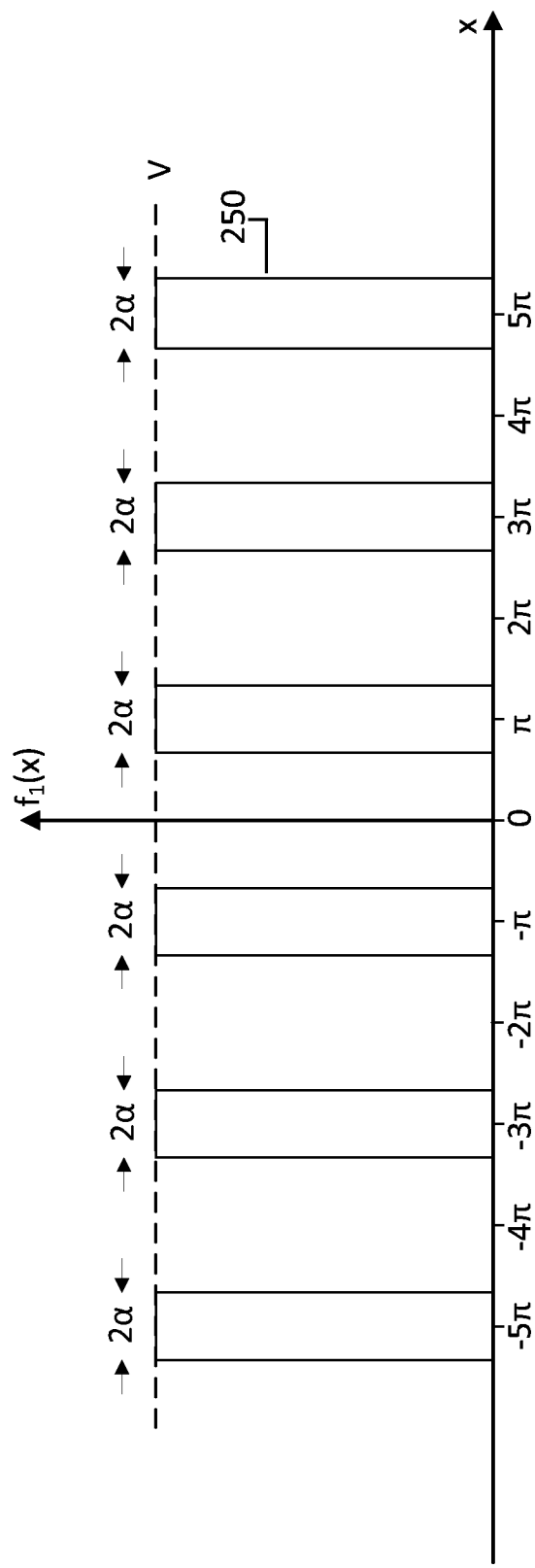
FIG. 2B is a graph illustrating a square wave that is a fixed duty ratio wave that may be used as a basis PWM signal of FIG. 2A, in accordance with embodiments of the present invention.
Figure 2C:
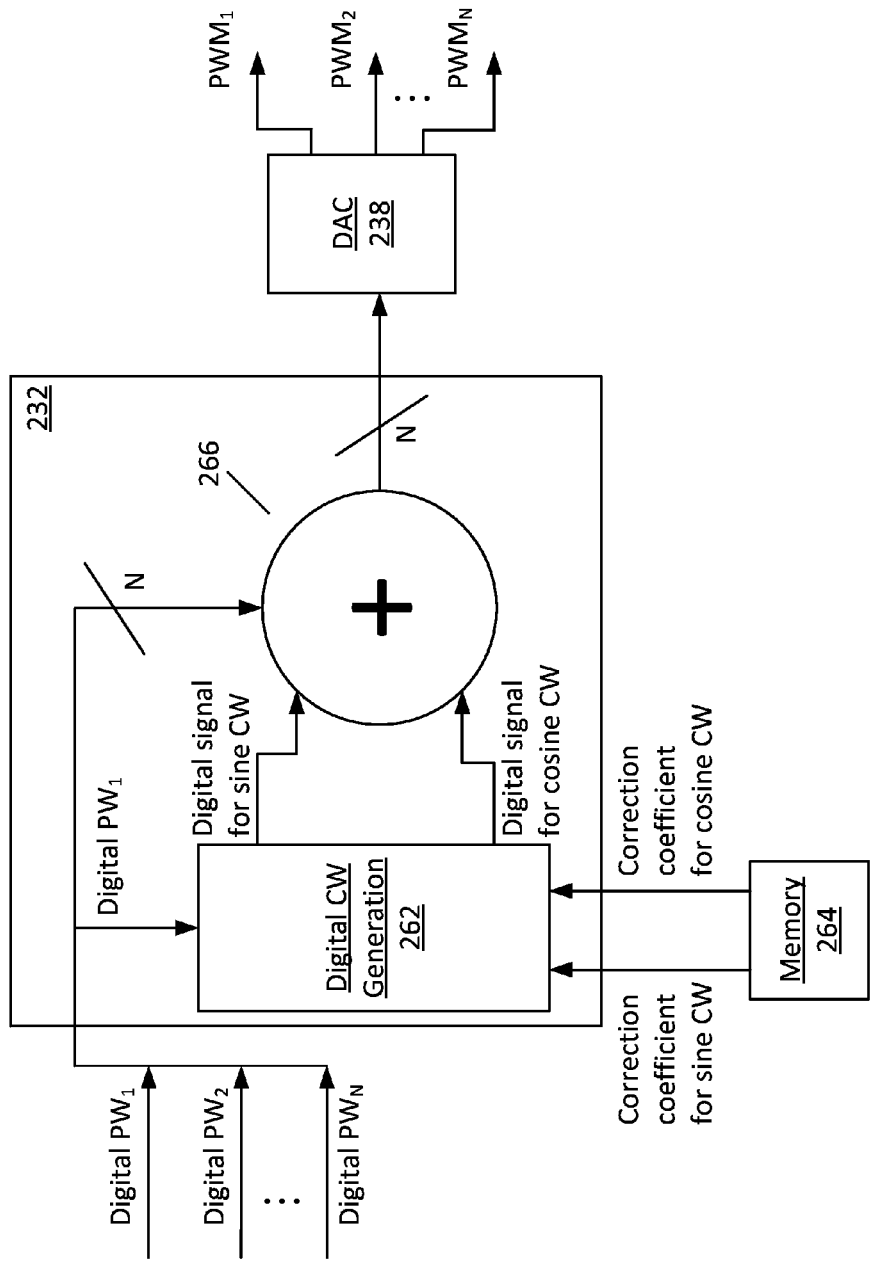
FIG. 2C is a block diagram illustrating the spur correction circuit of FIG. 2A, in accordance with embodiments of the present invention.

During a normal operation mode, a DAC 238 included in the PWM generation circuit 204 generates the analog signals PWM$_1$ to PWM$_N$ from N digital signals that have been digitally injected with a CW sine signal and CW cosine signal in the spur correction circuit 232, which will be further described in reference to FIG. 2C. These CW signals are scaled in accordance with calibrated correction coefficients, which will be further described in reference to FIG. 2B. In some embodiments, the transmit DAC 220 and the PWM generation DAC 238 are replaced by a single, higher-speed DAC.

FIG. 2B shows an embodiment square wave 250, which is a fixed duty ratio wave that may be used as the basis PWM signal PWM$_1$ of FIG. 2A. In other embodiments, a signal with variable duty ratio may be used as the basis PWM signal.

Referring again to FIG. 2B, the square wave 250 of FIG. 2B has a duty ratio of $\alpha/\pi$ and a voltage that alternates between a low-level voltage and a high-level voltage that is V volts greater than the low-level voltage. A present period of square wave 250 in a range from ($x \in [0, 2\pi)$) is mathematically described according to Equation 1 below:

$$f_1^{0 \, to \, 2\pi}(x) = \begin{cases} 0, & x < \pi - \alpha \\ V, & \pi - \alpha \leq x \leq \pi + \alpha \\ 0, & \pi - \alpha < x < 2\pi \end{cases} \quad \text{(Eq. 1)}$$

Using a Fourier transformation, Equation 2 is then derived to describe the square wave 250 as a superposition of sinusoidal functions:

$$f_1(x) = \frac{V\alpha}{\pi} + \sum_{m=1}^{\infty} (-1)^m \frac{2V}{m\pi}[\sin(m\alpha)\cos(mx)] = \frac{V\alpha}{\pi} - \quad \text{(Eq. 2)}$$
$$\frac{2V}{\pi}\left[\frac{\sin(\alpha)\cos(x)}{1} - \frac{\sin(2\alpha)\cos(2x)}{2} + \frac{\sin(3\alpha)\cos(3x)}{3} \cdots \right]$$

On the right-hand side of Equation 2, the term $$\frac{V\alpha}{\pi}$$

is the DC component, the term $$-\frac{2\,V}{\pi}[\sin(\alpha)\cos(x)]$$

is the first-order harmonic clock spur, and the term $$\frac{V}{\pi}[\sin(2\alpha)\cos(2x)]$$

is the second-order harmonic clock spur, etc. More generally, on the left-hand side of Equation 2, the term $$(-1)^m \frac{2\,V}{m\pi}[\sin(m\alpha)\cos(mx)]$$

is the mth-order harmonic clock spur of the single square wave 250.

In embodiments that use the single square wave 250 as the basis signal PWM$_1$ of FIG. 2A, the N signals PWM$_1$ to PWM$_N$ will be square wave signals staggered in phase by $$\frac{2\pi}{N}$$

as they are propagated across the N parallel signal paths 206$_1$ to 206$_N$ and then additively combined. As a hypothetical ideal example, if these parallel signal paths were perfectly identical with ideal linear gain, the superposition $f_{Nm}^{ideal}(x)$ of the first to mth-order harmonic clock spurs of the combined signal would be mathematically described according to Equation 3 below:

$$f_{Nm}^{ideal}(x) = \left[\frac{(-1)^m 2\,V}{\pi m}\right]\left[\sum_{n=1}^{N-1}\left(\sin(m\alpha)\cos(mx) + \frac{2\pi mn}{N}\right)\right] \quad \text{(Eq. 3)}$$
$$= 0$$

In this hypothetical ideal example, since no delay or gain mismatch is present between these N parallel signal paths, the amplitude of $f_{Nm}^{ideal}(x)$ is zero, i.e., the first to mth-order harmonic clock spurs are completely cancelled. However, when square wave signals are used as the signals PWM$_1$ to PWM$_N$ of the non-ideal system 200 of FIG. 2A, each of the N phase-staggered square waves is propagated across a respective path n of signal paths $206_1$-$206_N$ that includes delay mismatch $\delta_n$ (deviating from the ideal case of 0) and gain mismatch $g_n$ (deviating from the ideal case of 1). During a calibration sequence in which the spur correction circuit 232 is initially disabled, the superposition $f_{Nm}(x)$ of the first to mth-order harmonic clock spurs of the resulting $V_{out}$ signal may thus be modeled according to Equation 4 below:

$$f_{Nm}(x) = \left[\frac{(-1)^m 2\,V}{\pi m}\right]\left[\sum_{n=1}^{N-1}\left(\sin(m\alpha)\cos(mx) + \frac{\sin(m\alpha)\cos(mx) +}{\frac{2\pi mn}{N} + m\delta_n}\right)\right] \quad \text{(Eq. 4)}$$

Trigonometric identities are then used to rewrite Equation 4 in a form having separate cos(mx) and sin(mx) terms, yielding Equation 5 below:

$$f_{Nm}(x) = \left|\left[\frac{(-1)^m 2\,V\sin(m\alpha)}{\pi m}\right] \times \left[\left[\cos(mx)\left[\sum_{n=1}^{N-1} g_n\left[\begin{array}{c}\cos\left(\frac{2\pi mn}{N}\right)\cos(m\delta_n) - \\ \sin\left(\frac{2\pi mn}{N}\right)\sin(m\delta_n)\end{array}\right]\right]\right] + \left[\sin(mx)\left[\sum_{n=1}^{N-1} g_n\left[\begin{array}{c}-\sin\left(\frac{2\pi mn}{N}\right)\cos(m\delta_n) - \\ \cos\left(\frac{2\pi mn}{N}\right)\sin(m\delta_n)\end{array}\right]\right]\right]\right]\right| \quad \text{(Eq. 5)}$$

Parameters $epsc_{Nm}$ and $epss_{Nm}$ are then respectively defined according to Equations 6 and 7 below for the mth-order harmonic of an N-phase system:

$$epsc_{Nm} = \left[1 + \sum_{n=1}^{N-1} g_n\left[\begin{array}{c}\cos\left(\frac{2\pi mn}{N}\right)\cos(m\delta_n) - \\ \sin\left(\frac{2\pi mn}{N}\right)\sin(m\delta_n)\end{array}\right]\right] \quad \text{(Eq. 6)}$$

$$epss_{Nm} = \left[\sum_{n=1}^{N-1} g_n\left[\begin{array}{c}-\sin\left(\frac{2\pi mn}{N}\right)\cos(m\delta_n) - \\ \cos\left(\frac{2\pi mn}{N}\right)\sin(m\delta_n)\end{array}\right]\right] \quad \text{(Eq. 7)}$$

Using these definitions, the estimated superposition $f_{Nm}(x)$ of the first to mth-order harmonic clock spurs of Equation 5 can be rewritten according to Equation 8 below:

$$f_{Nm}(x) = \left[\frac{(-1)^m 2\,V\sin(m\alpha)}{\pi m}\right][[epsc_{Nm}\cos(mx)] + [epss_{Nm}\sin(mx)]] \quad \text{(Eq. 8)}$$

Equation 8 demonstrates the principle that the superposition of the harmonic clock spurs of the $V_{out}$ signal (when spur correction circuit 232 is disabled during calibration) is composed of both a cosine term and a sine term with amplitudes respectively proportional to $epsc_{Nm}$ and $epss_{Nm}$.

FIG. 2C, which shows the embodiment spur correction circuit 232 of FIG. 2A in greater detail, illustrates how Equation 8 may be implemented to adjust the correction provided by spur correction circuit 232. The correction coefficients of spur correction circuit 232 are stored in memory locations of a memory circuit 264 included in the PWM generation circuit 204. In an embodiment, during the calibration sequence these correction coefficients are initially set to zero, and a spectrum analyzer or the dedicated spur monitoring circuit 240 of FIG. 2A is connected to detect the amplitudes of clock spur harmonic artifacts that are present in signal $V_{out}$ of FIG. 2A.

Referring again to FIG. 2C, the spur correction circuit 232 includes a digital adder 266. For correcting an mth-order harmonic, the digital adder 266 adds digital samples for a cosine CW to each of Pulse Wave (PW) digital signals $PW_1$ to $PW_N$ for respectively generating $PWM_1$ to $PWM_N$. This digital signal for a cosine CW has a signal level of $\sin(m\alpha)$ multiplied by a calculated correction coefficient $$\left[cc_{Nm}^{calc} = -epsc_{Nm}\left[\frac{(-1)^m 2\,V}{\pi m}\right]\right].$$

This digital cosine CW signal also has a sinusoidal frequency that is the same as that of the cosine clock spur artifact (i.e. the frequency of the cos(mx) term of Equation 8).

The digital adder 266 also digitally adds digital samples for a sine CW to these N digital signals. This digital signal for a sine CW has a signal level of $\sin(m\alpha)$ multiplied by another calculated correction coefficient $$\left[cc_{Nm}^{calc} = -epss_{Nm}\left[\frac{(-1)^m 2\,V}{\pi m}\right]\right].$$

Thus, the ratio of the digital sine CW signal level divided by the digital cosine CW signal level is $[cs_{Nm}^{calc}/cc_{Nm}^{calc} = epss_{Nm}/epsc_{Nm}]$. This digital sine CW signal also has a sinusoidal frequency that is the same as that of the sine clock spur artifact (i.e. the frequency of the sin(mx) term of Equation 8).

The digital samples for the cosine CW and the sine CW are generated by digital CW generation circuit 262, which retrieves the correction coefficients from memory circuit 264 and also receives signal $PW_1$ as an input. The digital CW generation circuit 262 calculates the duty ratio $\alpha$ for the present period of signal $PW_1$. During this present period, the spur correction circuit 232 treats the basis signal $PW_1$ the same as if it were a fixed duty ratio signal. In an embodiment, in the next period of the basis signal $PW_1$, the digital CW generation circuit 262 may recalculate the new duty ratio $\alpha$ again and repeat the CW sample generation process. Using this technique, only the $\sin(m\alpha)$ term of Equation 8 varies with the duty ratio of the basis signal; this technique allows adaptation of spur correction circuit 232 to provide spur correction not only for fixed-duty PWM signals such as the square wave 250 of FIG. 2B, but also for modulated signals such as, for example, LTE signals, in which the duty ratio $\alpha$ is variable and may change over time. In other embodiments, the duty ratio $\alpha$ does not change from one period to the next but instead is also stored and retrieved from memory circuit 264.

In an embodiment, after values of the correction coefficients are first calculated during the calibration sequence, these calculated values are further adjusted during the calibration sequence to respectively reduce the sine and cosine artifact amplitudes that are present in signal $V_{out}$ of FIG. 2A, resulting in final correction coefficients $cc'_{Nm}$ and $cs'_{Nm}$ that the spur correction circuit 232 respectively uses for digitally injecting the cosine CW and the sine CW during normal operation. In an embodiment, the final correction coefficients reduce the clock spur's artifact amplitudes to minimum values relative to the resolution of system 200 of FIG. 2A. In other embodiments, the calculated correction coefficients $cc_{Nm}^{calc}$ and $cs_{Nm}^{calc}$ are used during normal operation without further adjustment.

Referring again to FIG. 2C, the digital CW signals provided by digital CW generation circuit 262 include a sufficiently large number of discrete samples such that a sampling frequency $f_{samp}$ of these samples is not less than the Nyquist frequency (i.e., twice the frequency) of the clock spur harmonics to be corrected. The digital CW generation circuit 262 may include, for example, a look-up table containing values of $\sin(m\alpha)$, $\sin(mx)$, and $\cos(mx)$ of Equation 8 for different values of m, $\alpha$, and x. The digital CW generation circuit 262 may also include, for example, a digital multiplier built from digital adders. The digital adder 266 may include, for example, digital logic gates, a shift register, etc.

Figure 3:
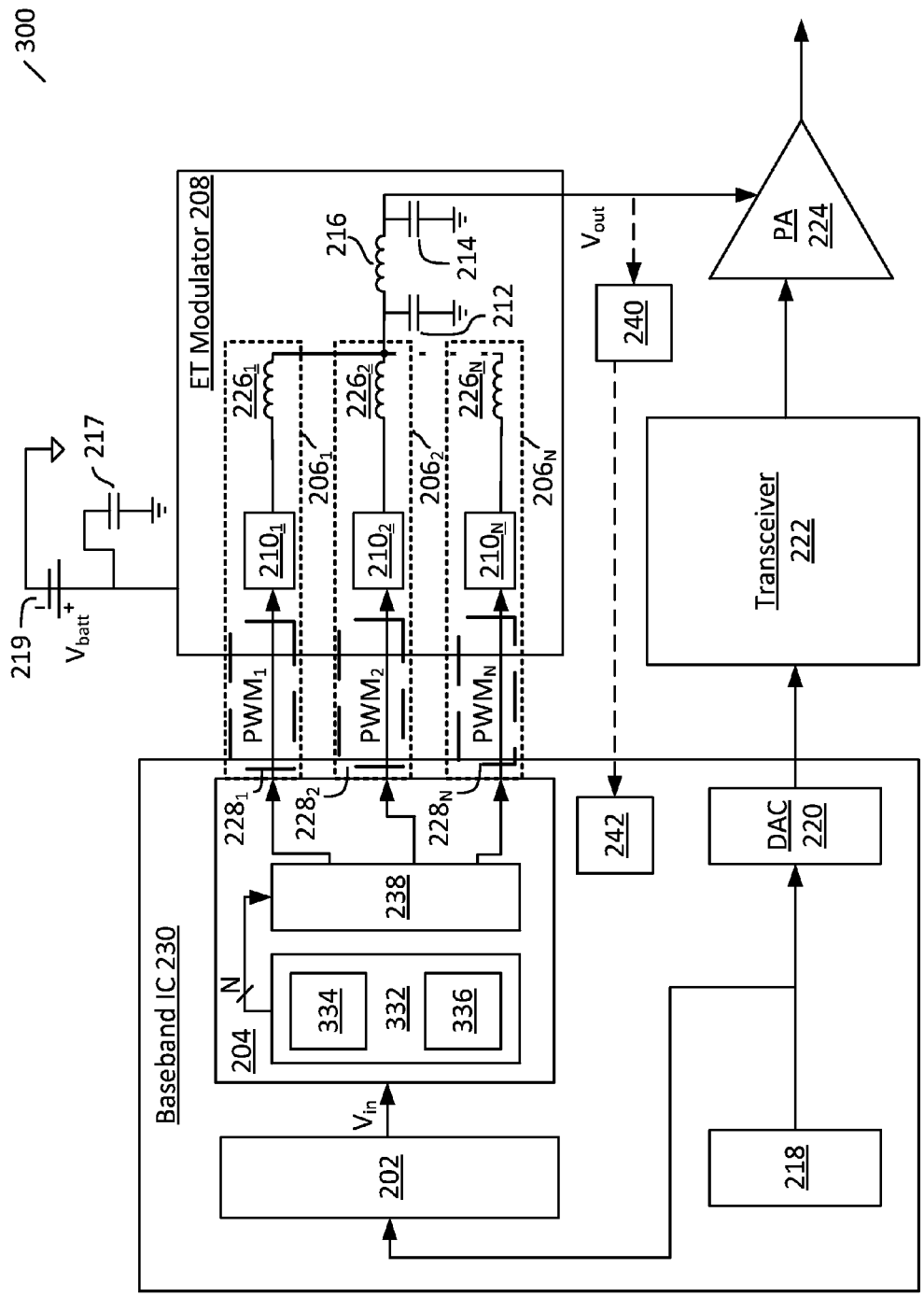
FIG. 3 is a block diagram illustrating an alternative PWM ET system that may be used in the multi-phase ET system of FIG. 1, in accordance with embodiments of the present invention.

FIG. 3 shows an alternative embodiment system 300 that may be used in the multi-phase ET system 100 of FIG. 1. In the embodiment of FIG. 3, spur correction circuit 232 (shown in FIG. 2A) has been replaced by spur correction circuit 332. This spur correction circuit 332 includes a digital gain adjustment circuit 334 and a digital delay adjustment circuit 336 that respectively adjust the gain and delay of each signal path $206_1$ to $206_N$ to reduce clock spurs in $V_{out}$. For each PWM signal to be propagated across signal path n having a gain of $g_n$ and a delay of $\delta_n$, the gain adjustment circuit 334 provides an additional gain of $g_{comp\_n}$ such that the product of $g_{comp\_n}$ and $g_n$ is close to one, and the delay adjustment circuit 336 provides an additional delay of $\delta_{comp\_n}$ such that the sum of $\delta_{comp\_n}$ and $\delta_n$ is close to zero. In an embodiment, these adjustments are provided in the digital domain to one or more of the digital signals $PW_1$ to $PW_N$. In an embodiment, the gain adjustment circuit 334 adjusts the duty ratio of one or more of these digital signals. In an embodiment, the delay adjustment circuit 336 adjusts the delay of one or more of these digital signals to provide fine relative delay adjustment among the signal paths $206_1$ to $206_N$.

Figure 4A:
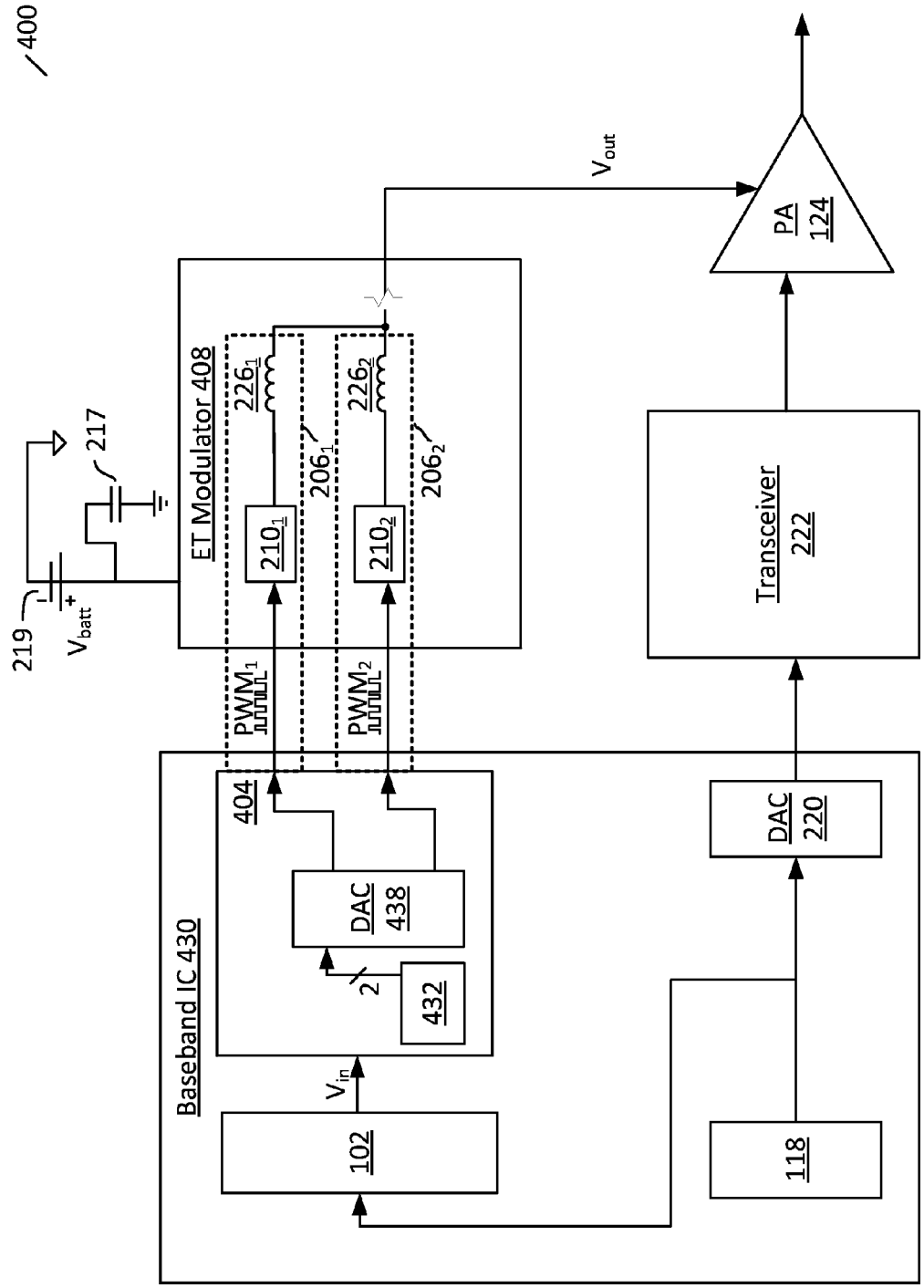
FIG. 4A is a block diagram illustrating a two-phase PWM ET system 400 with Continuous Wave (CW) injection to correct a first-order clock spur harmonic artifact, in accordance with embodiments of the present invention.

FIG. 4A shows an embodiment two-phase PWM ET system 400 with CW injection to correct a first-order clock spur harmonic artifact. The system 400 includes a baseband IC 430 that includes a two-phase PWM generation stage 404. The PWM generation stage 404 includes a two-phase spur correction circuit 432 and a DAC 438. The DAC 438 generates $PWM_1$ and $PWM_2$ signals from digital signals that have been injected with samples for the CW sine and cosine signals by the spur correction circuit 432. In an embodiment, the system 400 of FIG. 4A may be calibrated in a similar manner as the system 200 of FIG. 2A.

Referring again to FIG. 4A, the spur correction circuit 432 digitally injects CW signals to correct the first order harmonic clock spur that would be otherwise introduced by the two signal paths $206_1$ and $206_2$. In this case of two-phase, first order correction, Equation 4 reduces to Equation 10 below:

$$f_{21}(x) = -\frac{2V}{\pi}[\sin\alpha\cos x + [g_1[\sin\alpha \cdot \cos(x+\pi+\delta_1)]]] \quad \text{(Eq. 10)}$$

Using trigonometric identities, Equation 10 may be rewritten as Equation 11 below:

$$f_{21}(x) = -\frac{2V}{\pi}\sin\alpha[[1-g_1\cos(\delta_1)]\cos(x) + g_1\sin(\delta_1)\sin(x)] \quad \text{(Eq. 11)}$$

Assuming $g_1$ is close to 1 and $\delta_1$ is close to 0, the two-phase system 400 has a first-order clock spur harmonic artifact $f_{21}(x)$ that can be approximated according to Equation 12 below:

$$\begin{aligned} f_{21}(x) &\approx -\frac{2V}{\pi}\sin\alpha[(1-g_1)\cos(x) + \delta_1\sin(x)] \\ &= -\frac{2V}{\pi}\sin\alpha[epsc_{21}\cos(x) + epss_{21}\sin(x)] \end{aligned} \quad \text{(Eq. 12)}$$

Equation 12 thus shows that when correcting a first-order harmonic clock spur in two-phase system 400, injecting the cosine CW signal by spur correction circuit 432 will predominately correct gain mismatch of the signal paths $206_1$ and $206_2$, while injecting the sine CW signal by spur correction circuit 432 will predominately correct delay mismatch of the signal paths $206_1$ and $206_2$.

The digital CW signals generated by spur correction circuit 432 include a sufficiently large number of discrete samples such that a sampling frequency $f_{samp}$ of these samples is not less than the Nyquist frequency of the clock spur harmonics to be corrected. As an example, the sampling frequency $f_{samp}$ may be designed to be four times the switching frequency $f_{sw}$, such that when $f_{sw}$ is 61.44 MHz, $f_{samp}$ is 245.76 MHz. In this example, there are only four possible combinations of $\cos(x)$ and $\sin(x)$ values (shown in Equation 12) that repeat every period of the basis signal $PWM_1$. Choosing the values of x to be equal to $\{2k\pi+\pi/4, 2k\pi+3\pi/4, 2k\pi+5\pi/4, 2k\pi+7\pi/4\}$, where k is an integer, the cosine and sine terms of Equation 12 give the following four value combinations for this example:

$$[\cos(x), \sin(x)] = \frac{\sqrt{2}}{2}\{[+1,+1], [-1,+1], [-1,-1], [+1,-1]\}. \quad \text{(Eq. 13)}$$

By calculating adjusted correction coefficients that include the $$\left(\frac{\sqrt{2}}{2}\right)$$

factor of Equation 13, the $\cos(x)$ and $\sin(x)$ values of Equation 13 can be implemented at high speed by simply reversing the sign of the injected CW signals.

Figure 4B:
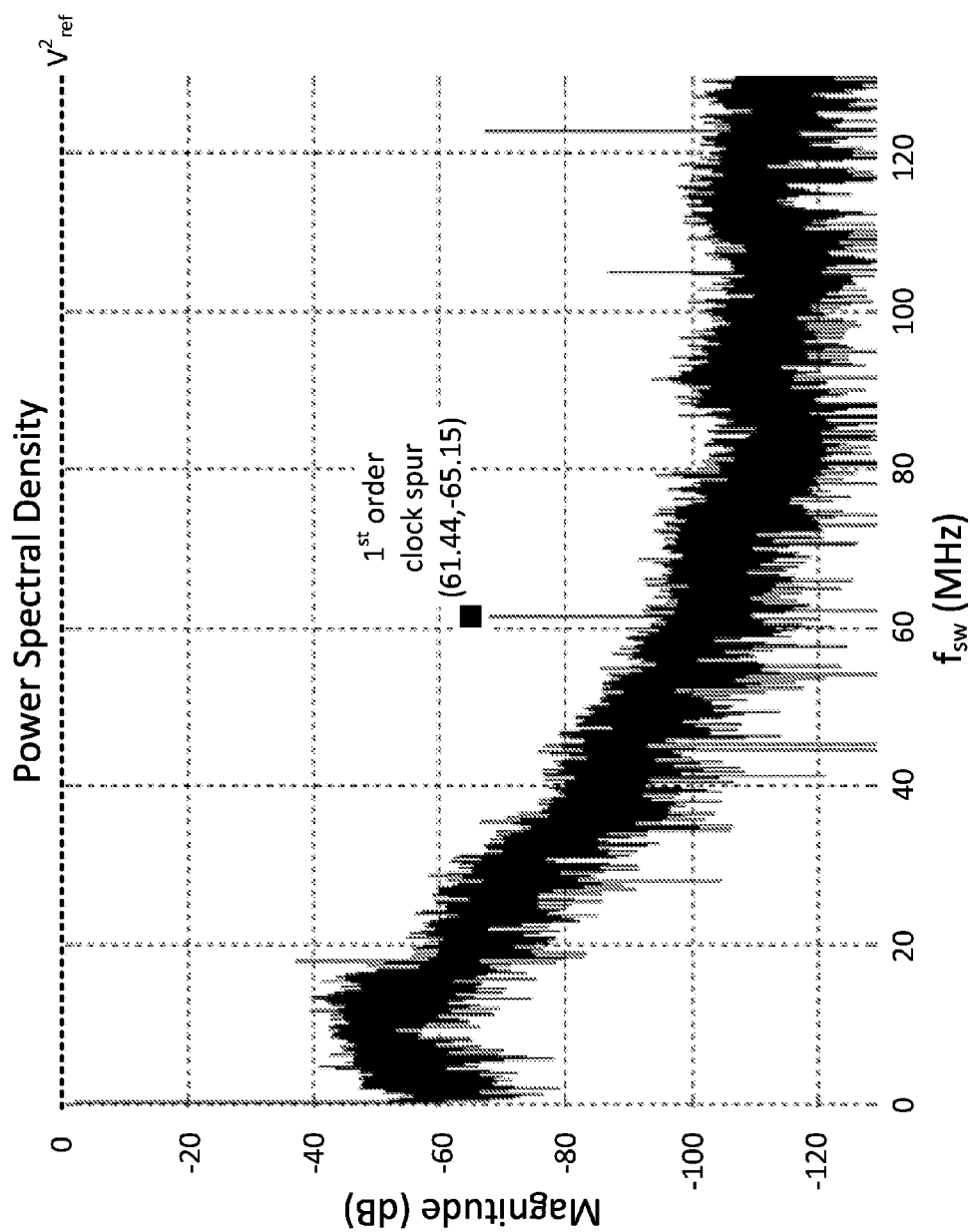
FIG. 4B is a graph illustrating an example power spectral density of the output signal of the ET modulator of FIG. 4A with spur correction disabled, in accordance with embodiments of the present invention.

FIG. 4B shows an example power spectral density of the output signal of ET modulator 408 of FIG. 4A when $f_{sw}$ is 61.44 MHz and spur correction circuit 432 is disabled. At 61.44 MHz, a first-order harmonic clock spur is present in $V_{out}$, and has a voltage-squared magnitude of −65.25 decibels relative to a reference voltage-squared magnitude $V^2_{ref}$.

Figure 4C:
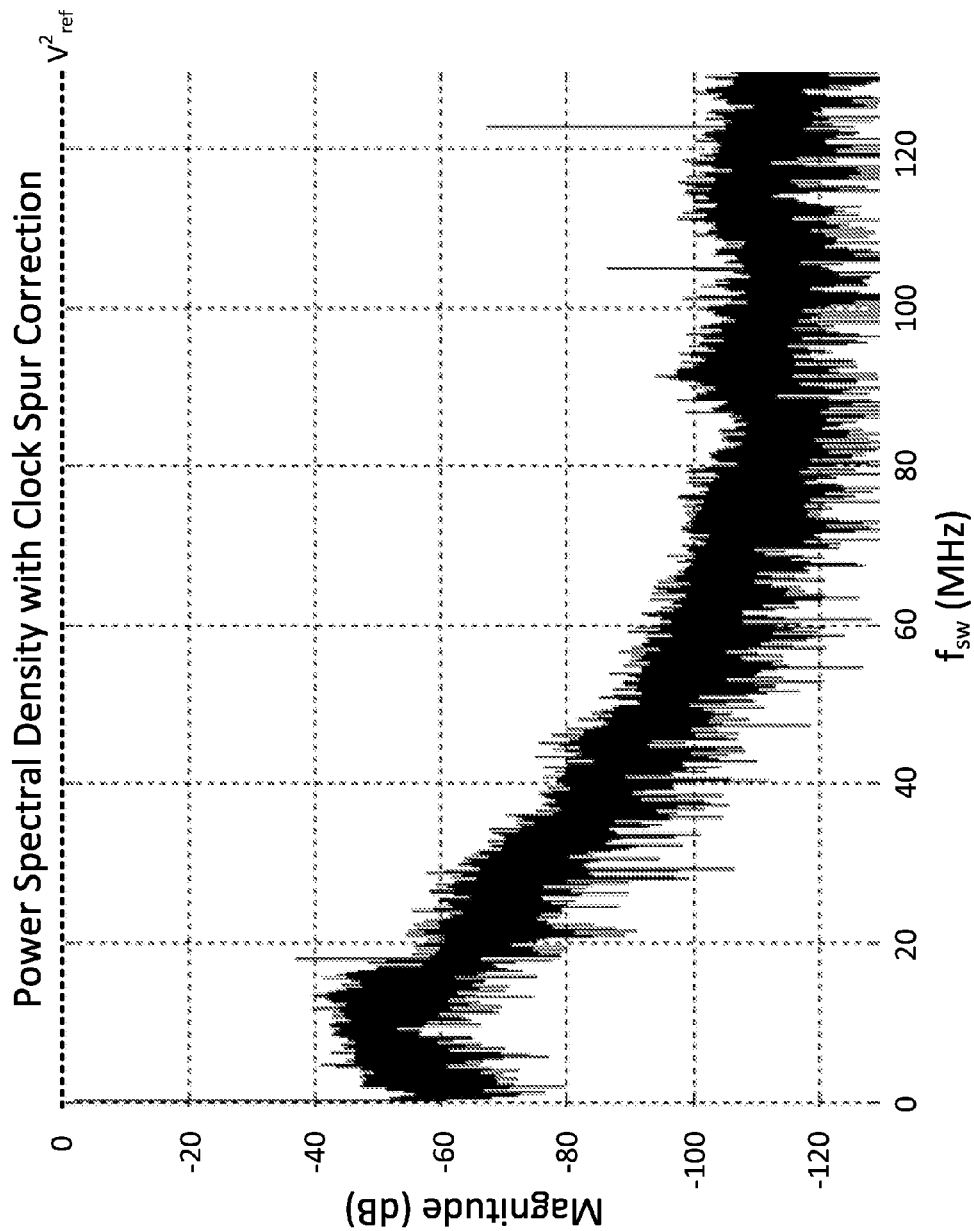
FIG. 4C is a graph illustrating an example power spectral density of the output signal of the ET modulator of FIG. 4A with spur correction enabled, in accordance with embodiments of the present invention.

FIG. 4C shows an example power spectral density of the output signal of ET modulator 408 of FIG. 4A when $f_{sw}$ is 61.44 MHz and the correction coefficients of spur correction circuit 432 have been calibrated. The magnitude of the 61.44 MHz first-order harmonic clock spur has been reduced by more than 30 dB as compared to that shown in FIG. 4B, causing the clock spur to disappear below the noise floor.

Figure 5A:
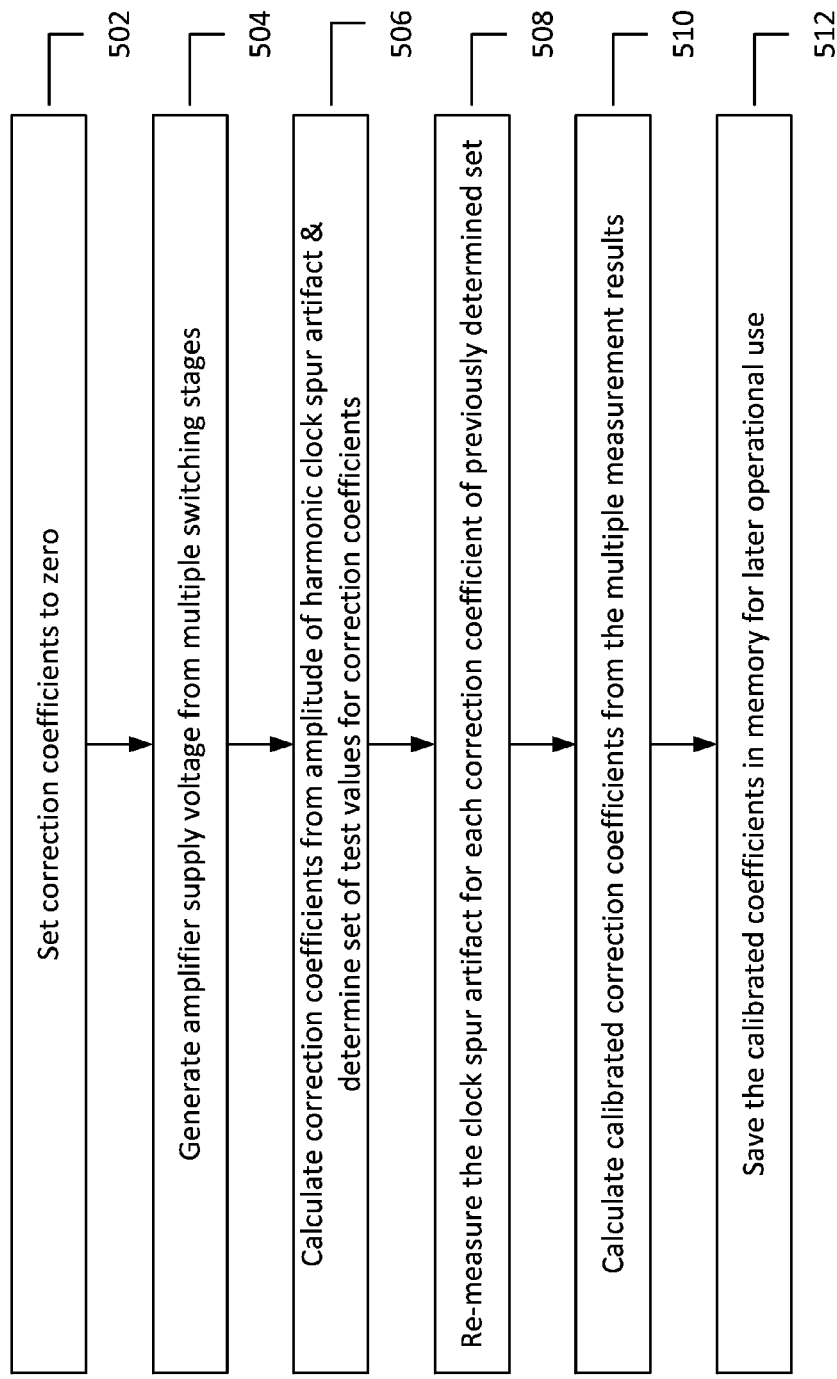
FIG. 5A is a flow diagram illustrating a calibration method for a clock spur artifact correction system in accordance with embodiments of the present invention.

FIG. 5A shows an embodiment calibration method for a clock spur artifact correction system. At step 502, correction coefficients of a spur correction circuit are set to zero. At step 504, multiple switching stages generate an amplifier supply voltage. At step 506, the amplitude of a clock spur harmonic artifact of the amplifier supply voltage signal is detected, and correction coefficients are then calculated from this clock spur amplitude. A set of test values for the correction coefficients are then determined in accordance with the calculated correction coefficients. At step 508, the correction coefficients are adjusted multiple times using the previously determined set of test values. During each adjustment, input signals for the multiple switching stages are obtained that are ET signals generated in accordance with the amplifier input signal level, and a continuous sine wave and a continuous cosine wave are added to the switching stage input signals in accordance with the adjusted correction coefficients. The signal level of the clock spur artifact is re-measured and recorded for each of these pre-determined sets of correction coefficient test values. At step 510, calibrated correction coefficients that reduce the amplitude of the clock spur artifact are calculated from the multiple measurements of step 508. In some embodiments, these calibrated correction coefficients may be optimal correction coefficients that minimize the signal level of the clock spur artifact. Referring again to FIG. 5A, at step 512 the calibrated correction coefficients are saved in memory for later operational use.

Figure 5B:
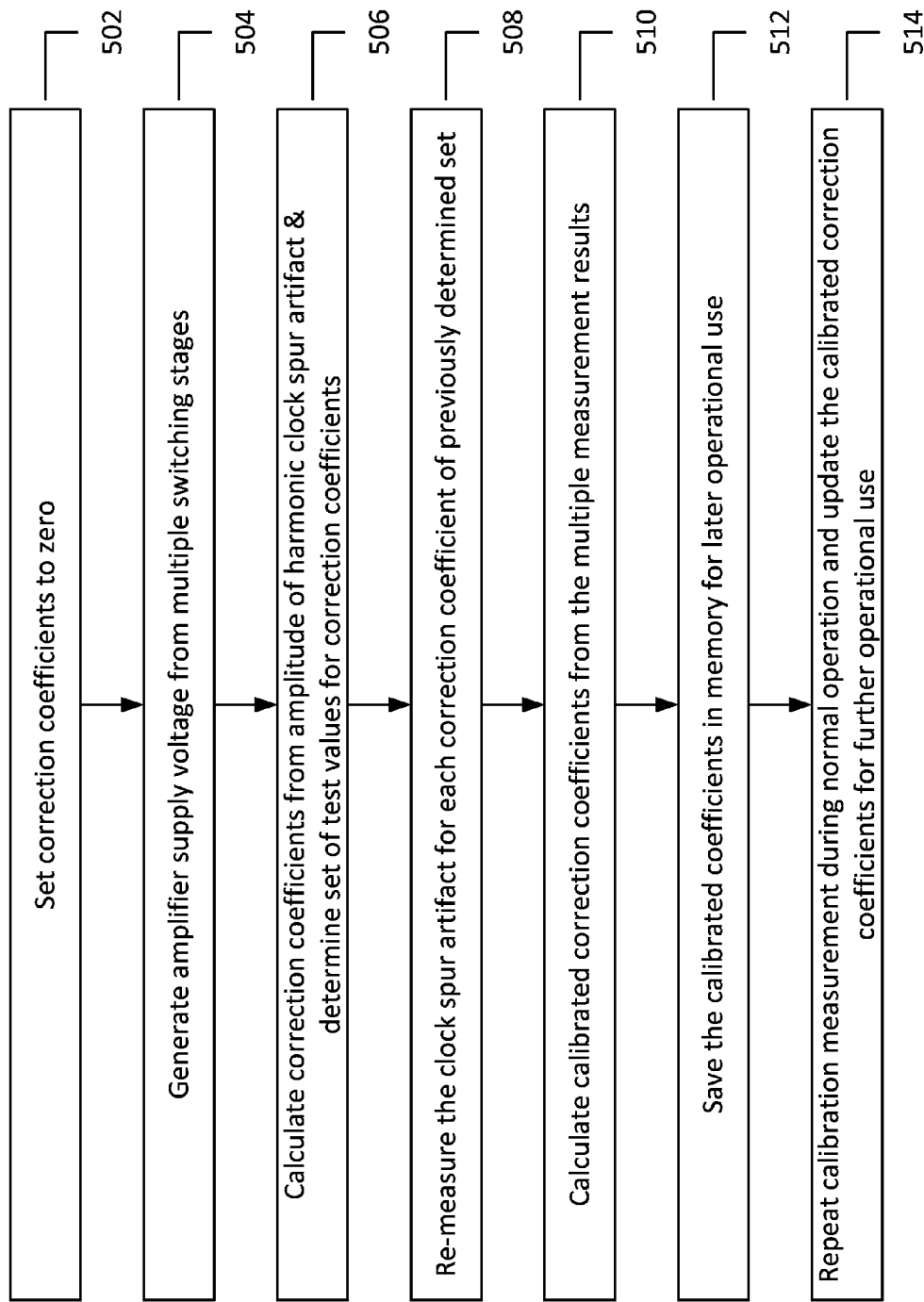
FIG. 5B is a flow diagram illustrating an alternative calibration method, in accordance with embodiments of the present invention in accordance with embodiments of the present invention.

FIG. 5B shows another embodiment calibration method, which is an alternative to that of FIG. 5A and which includes an additional step 514. This additional step includes updating the calibrated correction coefficients during normal operation to further improve the effectiveness of the calibration. The updated calibration coefficients are saved in memory and used for any further normal operation of the ET system.

Figure 6:
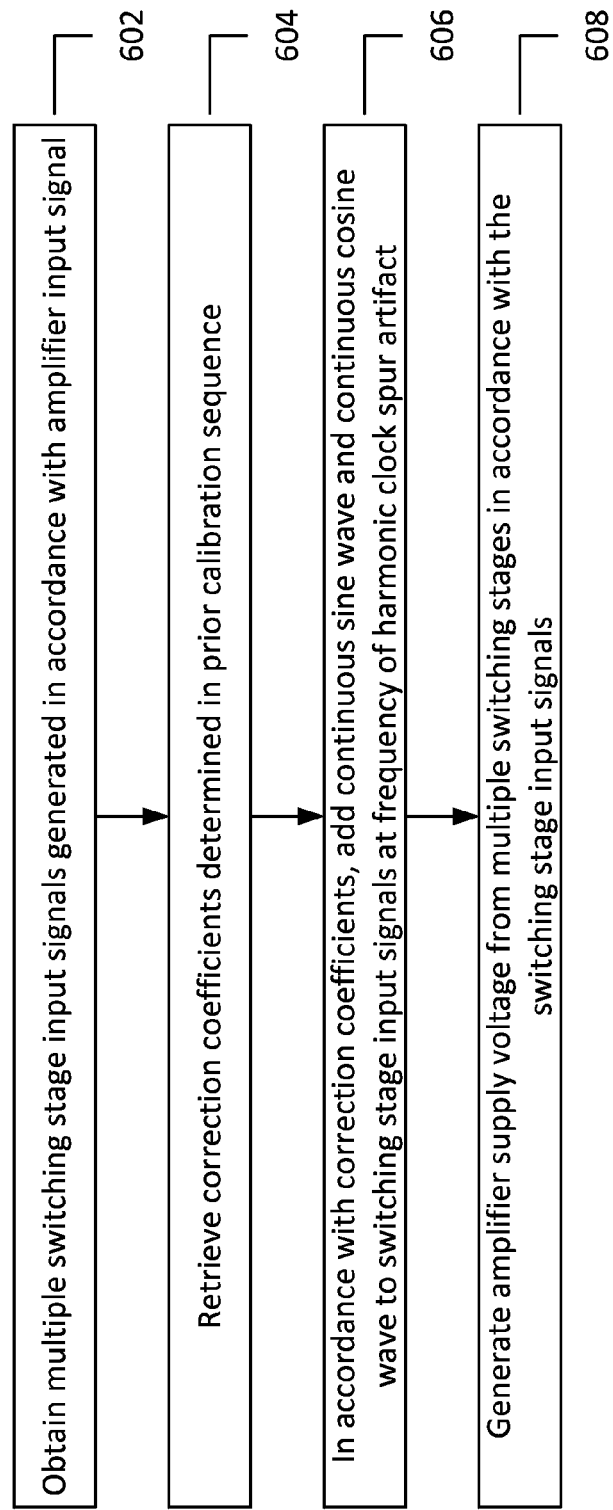
FIG. 6 is a flow diagram illustrating a method for clock spur artifact correction, in accordance with embodiments of the present invention.

FIG. 6 shows an embodiment method for clock spur artifact correction. At step 602, multiple switching stage input signals are obtained. These switching stage input signals are ET signals that have been generated in accordance with an amplifier input signal level. At step 604, correction coefficients are retrieved that were previously determined using, for example, the calibration method of FIG. 5A or the calibration method of FIG. 5B. At step 606, a continuous sine wave and a continuous cosine wave are added to the switching stage input signals in accordance with the correction coefficients. At step 608, multiple switching stages generate an amplifier supply voltage in accordance with the switching stage input signals.

Figure 7A:
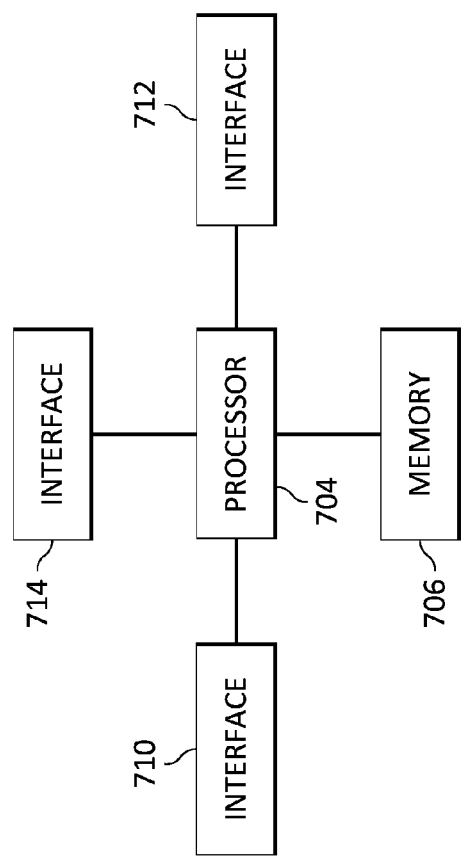
FIG. 7A illustrates a block diagram of a processing system for performing methods described herein, in accordance with embodiments of the present invention.

FIG. 7A illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., Personal Computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a User Equipment (UE), a PC, a tablet, a wearable communications device (e.g., a smartwatch, etc.), or any other device adapted to access a telecommunications network.

Figure 7B:
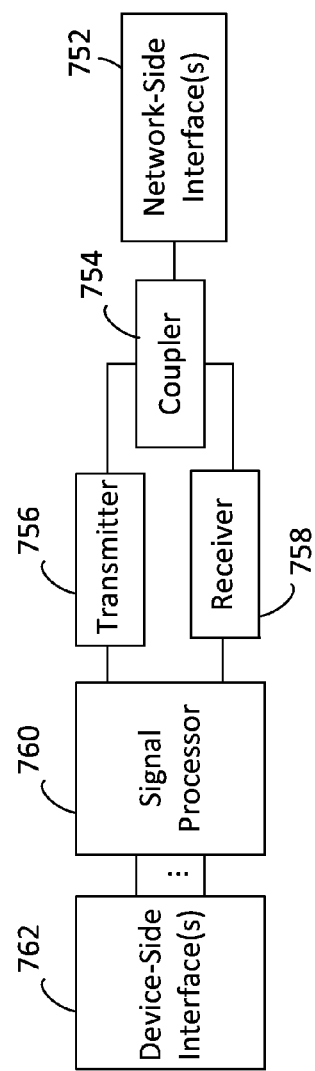
FIG. 7B illustrates a block diagram of a transceiver adapted to transmit and receive signaling over a telecommunications network, in accordance with embodiments of the present invention.

In some embodiments, one or more of the interfaces 710, 712, 714 connects the processing system 700 to a transceiver adapted to transmit and receive signaling over the telecommunications network. FIG. 7B illustrates a block diagram of a transceiver 750 adapted to transmit and receive signaling over a telecommunications network. The transceiver 750 may be installed in a host device. As shown, the transceiver 750 comprises a network-side interface 752, a coupler 754, a transmitter 756, a receiver 758, a signal processor 760, and a device-side interface 762. The network-side interface 752 may include any component or collection of components adapted to transmit or receive signaling over a wireless or wireline telecommunications network. The coupler 754 may include any component or collection of components adapted to facilitate bi-directional communication over the network-side interface 752. The transmitter 756 may include any component or collection of components (e.g., up-converter, power amplifier, etc.) adapted to convert a baseband signal into a modulated carrier signal suitable for transmission over the network-side interface 752. The receiver 758 may include any component or collection of components (e.g., down-converter, low noise amplifier, etc.) adapted to convert a carrier signal received over the network-side interface 752 into a baseband signal. The signal processor 760 may include any component or collection of components adapted to convert a baseband signal into a data signal suitable for communication over the device-side interface(s) 762, or vice-versa. The device-side interface(s) 762 may include any component or collection of components adapted to communicate data-signals between the signal processor 760 and components within the host device (e.g., the processing system 700, Local Area Network (LAN) ports, etc.).

The transceiver 750 may transmit and receive signaling over any type of communications medium. In some embodiments, the transceiver 750 transmits and receives signaling over a wireless medium. For example, the transceiver 750 may be a wireless transceiver adapted to communicate in accordance with a wireless telecommunications protocol, such as a cellular protocol (e.g., LTE, etc.), a Wireless Local Area Network (WLAN) protocol (e.g., Wi-Fi, etc.), or any other type of wireless protocol (e.g., Bluetooth, Near Field Communication (NFC), etc.). In such embodiments, the network-side interface 752 comprises one or more antenna/radiating elements. For example, the network-side interface 752 may include a single antenna, multiple separate antennas, or a multi-antenna array configured for multi-layer communication, e.g., Single Input Multiple Output (SIMO), Multiple Input Single Output (MISO), Multiple Input Multiple Output (MIMO), etc. In other embodiments, the transceiver 750 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Illustrative embodiments of the present invention have the advantage of reducing amplifier current consumption. Further advantages may include increasing transmitter efficiency in a wireless terminal such as a cell phone to increase the operating time or talk time available for the cell phone user, while also preventing degraded receiver sensitivity from residual clock spurs falling in the receiver frequency band after conversion to radio frequency by a PA. An embodiment system may modulate a PA supply voltage using an adjusted envelope tracking signal to prevent artifacts that would otherwise be introduced by the modulation.

The following additional example embodiments of the present invention are also provided. In accordance with a first example embodiment of the present invention, a method for clock spur artifact correction is provided. The method includes obtaining a plurality of switching stage input signals generated in accordance with an input signal level of an external amplifier, and adjusting the plurality of switching stage input signals such that a clock spur harmonic artifact is reduced. The clock spur harmonic artifact includes a first clock spur harmonic artifact generated in a plurality of external signal paths including external switching stages, and the adjusting the plurality of switching stage input signals includes one of: adjusting a duty ratio of one of the plurality of switching stage input signals in accordance with a gain mismatch between two of the external signal paths; and injecting a first CW signal into the plurality of switching stage input signals in accordance with a previous amplitude of the first clock spur harmonic artifact.

Also, the foregoing first example embodiment may be implemented to include one or more of the following additional features. The method may also be implemented such that the adjusting the plurality of switching stage input signals further includes: adjusting a delay of at least one of the plurality of switching stage input signals in accordance with a delay mismatch between two of the plurality of external signal paths. The method may also be implemented such that the adjusting the plurality of switching stage input signals includes the injecting the first CW signal, the injecting the first CW signal including: retrieving a first correction coefficient that was previously determined in accordance with the previous amplitude of the first clock spur harmonic artifact; and generating the first CW signal in accordance with the first correction coefficient. The method may also be implemented such that the plurality of switching stage input signals includes a basis signal and a phase-shifted replica of the basis signal, and the basis signal includes one of a PWM signal and a digital signal corresponding to a PWM signal. The method may also be implemented such that a sinusoidal frequency of the first CW signal is the same as a frequency of the first clock spur harmonic artifact. The method may also be implemented such that the frequency of the first clock spur harmonic artifact is an integer multiple m times a switching frequency of the external switching stages, the basis signal has a duty ratio a during a present period of the basis signal, and the generating the first CW signal includes determining a signal level of the first CW signal in accordance with a product of the first correction coefficient multiplied by sin(mα). The method may also be implemented such that the frequency of the first clock spur harmonic artifact is the same as a switching frequency of the external switching stages, the basis signal has a duty ratio α during a present period of the basis signal, and the generating the first CW signal includes: determining a signal level of a first sample in accordance with a product of the first correction coefficient multiplied by sin(α); and generating a plurality of samples including the first sample and a second sample having a signal level that is a negative of the signal level of the first sample. In such an implementation, the injecting the first CW signal further includes: obtaining digital signals corresponding to the plurality of switching stage input signals; and adding the plurality of samples to each of the digital signals. The method may also be implemented such that the clock spur harmonic artifact further includes a second clock spur harmonic artifact generated in the plurality of external signal paths, and the adjusting the plurality of switching stage input signals further includes: retrieving a second correction coefficient that was previously determined in accordance with a previous amplitude of the second clock spur harmonic artifact; generating a second CW signal in accordance with the second correction coefficient; and injecting the second CW signal into the plurality of switching stage input signals. The method may also be implemented such that the first clock spur harmonic artifact includes a sine wave, the first CW signal includes a digital signal corresponding to a sine wave, the second clock spur harmonic artifact includes a cosine wave, and the second CW signal includes a digital signal corresponding to a cosine wave. The method may also be implemented such that a signal level of the first CW signal includes a negative of the previous amplitude of the first clock spur harmonic artifact, and a ratio of a signal level of the first CW signal divided by a signal level of the second CW signal is the same as a ratio of the first correction coefficient divided by the second correction coefficient.

In accordance with a second example embodiment of the present invention, an integrated circuit is provided. The integrated circuit includes: a Digital-to-Analog Converter (DAC) including outputs coupled to a plurality of external signal paths, such that the external signal paths include external switching power supplies coupled to a supply voltage input of an external amplifier; and a spur correction circuit coupled between a data input of the external amplifier and an input of the DAC. The spur correction circuit includes: a digital Continuous Wave (CW) injection circuit including a digital adder circuit coupled between a memory circuit and the DAC, such that the memory circuit includes a first memory location storing a first correction coefficient that is proportional to a previous amplitude of a first clock spur harmonic component of an output signal of the plurality of external signal paths.

Also, the foregoing second example embodiment may be implemented to include one or more of the following additional features. The integrated circuit may also be implemented such that output signals of the DAC include a basis signal and a phase-shifted replica of the basis signal, and the basis signal includes a Pulse Width Modulated signal component and a first CW component. The integrated circuit may also be implemented such that a sampling frequency of the DAC is not less than twice a frequency of the first clock spur harmonic component. The integrated circuit may also be implemented such that the frequency of the first clock spur harmonic component is an integer multiple m times a switching frequency of the external switching power supplies, the basis signal has a duty ratio α during a present period of the basis signal, the DAC includes an input configured to receive a plurality of samples, and the plurality of samples includes a first sample having a signal level that is proportional to a product of the first correction coefficient multiplied by sin(mα). The integrated circuit may also be implemented such that the frequency of the first clock spur harmonic component is the same as the switching frequency of the external switching power supplies, and the plurality of samples further includes a second sample having a signal level that is a negative of the signal level of the first sample. The integrated circuit may also be implemented such that the memory circuit further includes a second memory location storing a second correction coefficient that is proportional to a previous amplitude of a second clock spur harmonic component of an output signal of the plurality of external signal paths, and the basis signal further includes a second CW component. The integrated circuit may also be implemented such that the first clock spur harmonic component includes a sine wave, the first CW component includes a sine wave, the second clock spur harmonic component includes a cosine wave, and the second CW component includes a cosine wave. The integrated circuit may also be implemented such that a ratio of an amplitude of the first CW component divided by an amplitude of the second CW component is the same as a ratio of the first correction coefficient divided by the second correction coefficient.

In accordance with a third example embodiment of the present invention, there is provided a calibration method including obtaining an amplifier supply voltage signal generated by a plurality of external switching stages. The method also includes: detecting an amplitude of a first clock spur harmonic artifact of the amplifier supply voltage signal; obtaining a plurality of switching stage input signals generated in accordance with an input signal level of an external amplifier; adding a first CW signal to the plurality of switching stage input signals, the first CW signal including a first signal level such that the amplitude of the first clock spur harmonic artifact is reduced; and determining a first correction coefficient in accordance with the first signal level.

Also, the foregoing third example embodiment may be implemented to include one or more of the following additional features. The method may also be implemented such that the first signal level includes a negative of the amplitude of the first clock spur harmonic artifact. The method may also be implemented such that the plurality of switching stage input signals includes a basis signal and a phase-shifted replica of the basis signal, and the basis signal includes one of a PWM signal and a digital signal corresponding to a PWM signal. The method may also be implemented such that a sinusoidal frequency of the first CW signal is the same as a frequency of the first clock spur harmonic artifact. The method may also be implemented such that the frequency of the first clock spur harmonic artifact is an integer multiple m times a switching frequency of the external switching stages, and the basis signal has a duty ratio α during a present period of the basis signal. In such an implementation, the adding the first CW signal further includes: calculating an initial signal level of the first CW signal in accordance with a product of the first correction coefficient multiplied by sin(mα); and adjusting the calculated initial signal level of the first CW signal to obtain the first signal level such that the amplitude of the first clock spur harmonic artifact is reduced. The method may also be implemented further including: detecting an amplitude of a second clock spur harmonic artifact of the amplifier supply voltage signal; adding, to the plurality of switching stage input signals, a second CW signal having a signal level such that the amplitude of the second clock spur harmonic artifact is reduced; and determining a second correction coefficient in accordance with the signal level of the second CW signal. The method may also be implemented such that the first clock spur harmonic artifact includes a sine wave, the first CW signal includes a digital signal corresponding to a sine wave, the second clock spur harmonic artifact includes a cosine wave, and the second CW signal includes a digital signal corresponding to a cosine wave. The method may also be implemented such that a ratio of the first signal level divided by the signal level of the second CW signal is the same as a ratio of the first correction coefficient divided by the second correction coefficient.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. In some embodiments, It is therefore intended that the appended claims encompass any such modifications or embodiments.

What is claimed is:

1. A method for clock spur artifact correction, comprising:
   obtaining a plurality of switching stage input signals generated in accordance with an input signal level of an external amplifier; and
   adjusting the plurality of switching stage input signals such that a clock spur harmonic artifact is reduced, wherein
   the clock spur harmonic artifact comprises a first clock spur harmonic artifact generated, from a clock signal, in a plurality of external signal paths comprising external switching stages, and
   the adjusting the plurality of switching stage input signals comprises injecting a first continuous wave (CW) signal into the plurality of switching stage input signals in accordance with a previous amplitude of the first clock spur harmonic artifact, the injecting the first CW signal comprising:
   retrieving a first correction coefficient that was previously determined in accordance with the previous amplitude of the first clock spur harmonic artifact; and
   generating the first CW signal in accordance with the first correction coefficient,
   wherein the plurality of switching stage input signals comprises a basis signal and a phase-shifted replica of the basis signal, and wherein the basis signal comprises one of a pulse width modulated (PWM) signal or a digital signal corresponding to a PWM signal.

2. The method of claim 1, wherein a sinusoidal frequency of the first CW signal is the same as a frequency of the first clock spur harmonic artifact.

3. The method of claim 1, wherein
   the clock spur harmonic artifact further comprises a second clock spur harmonic artifact generated in the plurality of external signal paths, and
   the adjusting the plurality of switching stage input signals further comprises:
   retrieving a second correction coefficient that was previously determined in accordance with a previous amplitude of the second clock spur harmonic artifact;
   generating a second CW signal in accordance with the second correction coefficient; and injecting the second CW signal into the plurality of switching stage input signals.

4. The method of claim 1, further comprising:
obtaining an amplifier supply voltage signal generated by the external switching stages;
detecting, from the amplifier supply voltage signal, a second amplitude of the first clock spur harmonic artifact, the second amplitude comprising the previous amplitude of the first clock spur harmonic artifact;
obtaining a second plurality of switching stage input signals generated in accordance with the input signal level of the external amplifier;
adding a third CW signal to the plurality of switching stage input signals, the third CW signal comprising a first signal level such that the first clock spur harmonic artifact is reduced in amplitude; and
determining a first correction coefficient in accordance with the first signal level.

5. The method of claim 2, wherein
the frequency of the first clock spur harmonic artifact is an integer multiple m times a switching frequency of the external switching stages,
the basis signal has a duty ratio α during a present period of the basis signal, and
the generating the first CW signal comprises determining a signal level of the first CW signal in accordance with a product of the first correction coefficient multiplied by $\sin(m\alpha)$.

6. The method of claim 2, wherein
the frequency of the first clock spur harmonic artifact is the same as a switching frequency of the external switching stages,
the basis signal has a duty ratio α during a present period of the basis signal, and
the generating the first CW signal comprises:
determining a signal level of a first sample in accordance with a product of the first correction coefficient multiplied by $\sin(\alpha)$; and
generating a plurality of samples comprising the first sample and a second sample having a signal level that is a negative of the signal level of the first sample, and
the injecting the first CW signal further comprises:
obtaining digital signals corresponding to the plurality of switching stage input signals; and
adding the plurality of samples to each of the digital signals.

7. The method of claim 3, wherein
the first clock spur harmonic artifact comprises a sine wave,
the first CW signal comprises a digital signal corresponding to a sine wave,
the second clock spur harmonic artifact comprises a cosine wave, and
the second CW signal comprises a digital signal corresponding to a cosine wave.

8. The method of claim 3, wherein
a signal level of the first CW signal comprises a negative of the previous amplitude of the first clock spur harmonic artifact, and
a ratio of a signal level of the first CW signal divided by a signal level of the second CW signal is the same as a ratio of the first correction coefficient divided by the second correction coefficient.

9. The method of claim 4, wherein the first signal level comprises a negative of the second amplitude of the first clock spur harmonic artifact.

10. The method of claim 4, further comprising:
detecting, from the amplifier supply voltage signal, a second amplitude of a second clock spur harmonic artifact, the second amplitude of the second clock spur harmonic artifact comprising the previous amplitude of the second clock spur harmonic artifact;
adding, to the plurality of switching stage input signals, a fourth CW signal having a signal level such that the second clock spur harmonic artifact decreases in amplitude; and
determining a second correction coefficient in accordance with the signal level of the fourth CW signal.

11. The method of claim 9, wherein a sinusoidal frequency of the first CW signal is the same as the sinusoidal frequency of the third CW signal.

12. The method of claim 10, wherein:
the third CW signal comprises a digital signal corresponding to a sine wave; and
the fourth CW signal comprises a digital signal corresponding to a cosine wave.

13. The method of claim 10, wherein a ratio of the first signal level divided by the signal level of the fourth CW signal is the same as a ratio of the first correction coefficient divided by the second correction coefficient.

14. The method of claim 11, wherein
the adding the third CW signal further comprises:
calculating an initial signal level of the third CW signal in accordance with a product of the first correction coefficient multiplied by $\sin(m\alpha)$; and
adjusting the calculated initial signal level of the third CW signal to obtain the first signal level such that the first clock spur harmonic artifact decreases in amplitude.

15. An integrated circuit, comprising:
a digital-to-analog converter (DAC) comprising outputs coupled to a plurality of external signal paths, wherein the external signal paths comprise external switching stages coupled to a supply voltage input of an external amplifier; and
a spur correction circuit coupled between a data input of the external amplifier and an input of the DAC, wherein:
the spur correction circuit is configured for:
obtaining a plurality of switching stage input signals generated in accordance with an input signal level of the external amplifier; and
adjusting the plurality of switching stage input signals such that a clock spur harmonic artifact is reduced;
the clock spur harmonic artifact comprises a first clock spur harmonic artifact generated, from a clock signal, in the plurality of external signal paths; and
the adjusting the plurality of switching stage input signals comprises injecting a first continuous wave (CW) signal into the plurality of switching stage input signals in accordance with a previous amplitude of the first clock spur harmonic artifact, the injecting the first CW signal comprising:
retrieving a first correction coefficient that was previously determined in accordance with the previous amplitude of the first clock spur harmonic artifact; and
generating the first CW signal in accordance with the first correction coefficient,
wherein the plurality of switching stage input signals comprises a basis signal and a phase-shifted replica of the basis signal, and wherein the basis signal comprises one of a pulse width modulated (PWM) signal or a digital signal corresponding to a PWM signal.

16. The integrated circuit of claim 15, wherein:
the spur correction circuit comprises a digital CW injection circuit comprising a digital adder circuit coupled between a memory circuit and the DAC; and
the memory circuit comprises a first memory location storing the first correction coefficient that is proportional to the previous amplitude of the first clock spur harmonic artifact.

17. The integrated circuit of claim 15, wherein a sampling frequency of the DAC is not less than twice a frequency of the first clock spur harmonic artifact.

18. The integrated circuit of claim 15, wherein
the memory circuit further comprises a second memory location storing a second correction coefficient that is proportional to a previous amplitude of a second clock spur harmonic artifact of an output signal of the plurality of external signal paths, and
the basis signal further comprises a second CW component.

19. The integrated circuit of claim 17, wherein:
the external switching stages comprise external switching power supplies;
the frequency of the first clock spur harmonic artifact is an integer multiple m times a switching frequency of the external switching power supplies;
the basis signal has a duty ratio $\alpha$ during a present period of the basis signal;
the DAC comprises an input configured to receive a plurality of samples; and
the plurality of samples comprises a first sample having a signal level that is proportional to a product of the first correction coefficient multiplied by $\sin(m\alpha)$.

20. The integrated circuit of claim 18, wherein
the first clock spur harmonic artifact comprises a sine wave,
the first CW component comprises a sine wave,
the second clock spur harmonic artifact comprises a cosine wave, and
the second CW component comprises a cosine wave.

21. The integrated circuit of claim 18, wherein a ratio of an amplitude of the first CW component divided by an amplitude of the second CW component is the same as a ratio of the first correction coefficient divided by the second correction coefficient.

22. The integrated circuit of claim 19, wherein
the frequency of the first clock spur harmonic artifact is the same as the switching frequency of the external switching power supplies, and
the plurality of samples further comprises a second sample having a signal level that is a negative of the signal level of the first sample.

* * * * *